US011270824B2

(12) United States Patent
Foley et al.

(10) Patent No.: US 11,270,824 B2
(45) Date of Patent: Mar. 8, 2022

(54) FERROMAGNETIC ACCESSORIES FOR A HANDHELD DEVICE

(71) Applicant: Scooch, LLC, Noblesville, IN (US)

(72) Inventors: Matthew A. Foley, Noblesville, IN (US); John A. Stagge, Noblesville, IN (US)

(73) Assignee: Scooch, LLC, Noblesville, IN (US)

( * ) Notice: Subject to any disclaimer, the term of this patent is extended or adjusted under 35 U.S.C. 154(b) by 176 days.

(21) Appl. No.: 16/247,315

(22) Filed: Jan. 14, 2019

(65) Prior Publication Data

US 2019/0221347 A1 Jul. 18, 2019

Related U.S. Application Data

(60) Provisional application No. 62/616,762, filed on Jan. 12, 2018.

(51) Int. Cl.
| | |
|---|---|
| *H01F 7/02* | (2006.01) |
| *H02J 7/02* | (2016.01) |
| *F16M 13/02* | (2006.01) |
| *H01F 38/14* | (2006.01) |

(52) U.S. Cl.
CPC ........... *H01F 7/0252* (2013.01); *F16M 13/02* (2013.01); *H01F 38/14* (2013.01); *H02J 7/025* (2013.01)

(58) Field of Classification Search
USPC ........................................................ 320/108
See application file for complete search history.

(56) References Cited

U.S. PATENT DOCUMENTS

| | | |
|---|---|---|
| 8,636,183 B1 | 1/2014 | Steiner |
| 8,851,386 B2 | 10/2014 | Phillips |
| 8,960,630 B2 | 2/2015 | Fu |
| 8,973,795 B2 | 3/2015 | Chiu, Jr. et al. |
| 8,996,064 B2 | 3/2015 | Heil-Brice et al. |
| 9,049,911 B1 | 6/2015 | Wood et al. |
| D763,857 S | 8/2016 | Dang et al. |

(Continued)

FOREIGN PATENT DOCUMENTS

| | | |
|---|---|---|
| CN | 204012772 | 12/2014 |
| CN | 105633565 | 6/2016 |

(Continued)

*Primary Examiner* — Robert Grant
(74) *Attorney, Agent, or Firm* — Frost Brown Todd LLC; Dennis S. Schell (57) ABSTRACT

A ferromagnetic accessory for a handheld device is disclosed. Embodiments include a housing having a first side and a second side, the first side adapted to be coupled to and cover at least a portion of a handheld device, and a ferromagnetic layer coupled to the housing and forming a planar pattern of alternating areas defined by ferromagnetic material and nonferromagnetic material. In at least one embodiment, the ferromagnetic material comprises elongate members and the ferromagnetic layer comprises a plurality of spaced-apart elongate members defining nonferromagnetic material areas therebetween. In other embodiments, the ferromagnetic layer is embedded within the housing. In other embodiments, the ferromagnetic accessory is a contiguous layer, a composite of an elastomer and ferromagnetic material and can be coupled directly to a handheld device or to the outside of a housing.

10 Claims, 7 Drawing Sheets

(56) References Cited

U.S. PATENT DOCUMENTS

| | | |
|---|---|---|
| 9,632,535 B2 | 4/2017 | Carnevali et al. |
| 9,738,431 B2 | 8/2017 | Clark et al. |
| 10,117,505 B1 | 11/2018 | Alvarez |
| D855,606 S | 8/2019 | Kim |
| D857,005 S | 8/2019 | Yu |
| D860,984 S | 9/2019 | Stagge |
| 10,419,054 B1 | 9/2019 | VanTassell et al. |
| 2002/0191451 A1 | 12/2002 | Kishi et al. |
| 2013/0098788 A1 | 4/2013 | McCarville et al. |
| 2014/0194168 A1 | 7/2014 | Lehmann |
| 2014/0285138 A1* | 9/2014 | Duschl-Graw ......... H01F 21/06 320/108 |
| 2015/0280442 A1 | 10/2015 | Graham |
| 2015/0303706 A1 | 10/2015 | Bronson et al. |
| 2015/0357716 A1* | 12/2015 | Chen .................... H04B 5/0081 343/702 |
| 2016/0111198 A1 | 4/2016 | Hasegawa et al. |
| 2016/0254678 A1 | 9/2016 | Standke et al. |
| 2016/0294427 A1 | 10/2016 | Wojcik |
| 2016/0372973 A1 | 12/2016 | Fitzgerald et al. |
| 2017/0085134 A1* | 3/2017 | Jeong ...................... H02J 50/60 |
| 2017/0264725 A1 | 9/2017 | Holder |
| 2017/0338676 A1* | 11/2017 | Yan .......................... H02J 7/14 |
| 2019/0006094 A1* | 1/2019 | Furiya ................ H01F 27/2823 |
| 2019/0216195 A1 | 7/2019 | Stagge |

FOREIGN PATENT DOCUMENTS

| | | |
|---|---|---|
| CN | 205510167 | 8/2016 |
| EP | 2869596 | 5/2015 |
| GB | 2492088 | 12/2012 |
| WO | 2009047769 | 4/2009 |
| WO | 2010129369 | 11/2010 |
| WO | 2012165688 | 6/2012 |
| WO | 2013142720 | 9/2013 |
| WO | 2017111842 | 6/2017 |

* cited by examiner

FERROMAGNETIC ACCESSORIES FOR A HANDHELD DEVICE

CROSS-REFERENCE TO RELATED APPLICATIONS

This application is a nonprovisional of and claims the benefit of U.S. Provisional Patent Application 62/616,762, filed Jan. 12, 2018, and titled Ferromagnetic Housing for a Handheld Device, the entirety of which is hereby incorporated herein by reference.

TECHNICAL FIELD

Embodiments of this disclosure relate generally to handheld devices, for example smartphones, mobile phones, electronic music players, data storage devices, and computers, and more particularly to accessories for handheld devices.

BACKGROUND

Many of today's handheld devices (e.g., smartphones, mobile phones, electronic music players, data storage devices, tablets, etc.) are now being equipped with wireless battery charging capabilities. Additionally, these same handheld devices are frequently being used with accessories including magnetic mounts for heads-up display in many environments such as, for example, in automobiles for navigation, hands-free telephone conversations, and/or entertainment. To create a housing (e.g., a fitted case) or mounting plate for the handheld device which is magnetically mountable to a magnetic accessory, a solid ferromagnetic material such as a stainless-steel flat disc is typically molded to or otherwise attached on the handheld device or within the housing coupled to the handheld device.

However, it was realized by the inventors of the present disclosure that when using a solid, flat disc of ferromagnetic material on the handheld device or within the housing for a handheld device, many wireless charging units will heat the ferromagnetic material and damage the housing or the handheld device itself. This is likely caused by the ferromagnetic material heating up due to a fluctuating electromagnetic field created by the inductive coil of the wireless charging unit. The electromagnetic field is meant to couple with and induce energy in a receiving inductive coil in the handheld device to be charged. With a ferromagnetic disc positioned between the charging and receiving induction coils, the electromagnetic field likely induces eddy currents in the ferromagnetic disc, which due to resistance, thereby creates heat, much like in a metal pan used on an induction stovetop. Additionally, presence of the ferromagnetic material either prevents or increases the time it takes to wirelessly recharge the battery of the handheld device because the energy produced by the inductive coil of the wireless charging unit is absorbed and dissipated by the ferromagnetic material rather than coupling with the receiving inductive coil in the handheld device.

One prior art solution moved the stainless steel disk to one end of the handheld device, so that the disk is no longer located between the charging coils when recharging and the disk is still available for coupling with a magnetic mount; however, locating the magnetic connection in a noncentral location of the handheld device increases the likelihood the magnetic coupling will separate and the device fall, particularly when utilize touchscreen functionality on an end opposite the disk and magnetic mount.

It was appreciated by the inventors of the present disclosure that advantages can be realized by providing a damage resistant and magnetic housing or plate for a handheld device which can be centrally located and also provides little to no reduction in wireless battery charging capabilities. The present disclosure is responsive to at least such an endeavor and at least some embodiments are directed to one or more of the problems or issues set forth above and may be directed to other problems as well.

SUMMARY

Embodiments of the present disclosure provide improved ferromagnetic accessories for a handheld device.

In accordance with one embodiment of the present disclosure, a ferromagnetic accessory for a handheld device can include a housing having a first side and a second side, the first side adapted to be coupled to and cover at least a portion of a handheld device, and a ferromagnetic layer coupled to the housing and forming a planar pattern of alternating areas defined by ferromagnetic material and nonferromagnetic material. Additionally, the ferromagnetic material can comprise of elongate members and the ferromagnetic layer can comprise of a plurality of spaced-apart elongate members defining nonferromagnetic material areas therebetween.

In other embodiments of the present disclosure, a ferromagnetic accessory for coupling to a handheld device can include a ferromagnetic structure forming a planar pattern. The planar pattern can include a plurality of ferromagnetic members arranged in parallel and joined together at one end wherein each one of the plurality of ferromagnetic members is spaced apart by a first distance, a void between two of the plurality of ferromagnetic members defined by a second distance wherein the second distance is greater than the first distance, and a nonferromagnetic material separating each of the plurality of ferromagnetic members.

Embodiments of the present disclosure can include additional features to provide stronger ferromagnetic properties along with conduciveness to electromagnetic induction charging for an associated handheld device. For example, the plurality of elongate members can be arranged in parallel, can be coupled at one end by a connecting portion of the ferromagnetic material, and can be spaced apart by approximately one to two millimeters. Further, in some embodiments, the plurality of elongate members can be, for example, approximately 33 millimeters in length, approximately one millimeter in width and thickness. Still further, in other embodiments, the ferromagnetic structure can be embedded within a housing adapted to be coupled to and cover at least a portion of the handheld device, and portions of the housing can define the nonferromagnetic material.

In yet another embodiment of the present disclosure, a mounting kit for a handheld device having a coil for wireless battery recharging is disclosed. The mounting kit can include a mounting base, a magnet coupled to the mounting base, and a planar ferromagnetic sheet adapted for attachment to the handheld device. The ferromagnetic sheet can be coupled to the magnet and can be configured to support the weight of the handheld device in a vertical mounting position. The ferromagnetic sheet can further be configured to permit an inductive power transfer therethrough for the wireless battery recharging of the handheld device.

The mounting kit of the present disclosure can include additional features which can provide a user with the ability to wirelessly recharge a handheld device using an inductive coil while also providing the user with the ability to vertically mount the handheld device using a magnetic mounting accessory. For example, embodiment can further include a double-sided adhesive coupled on a first side to the ferromagnetic sheet and on a second side to the handheld device. In another example, the ferromagnetic sheet comprises a composite of an elastomer and a ferrous material. In yet another example, the ferromagnetic sheet can be attached to the handheld device adjacent the coil for the wireless battery recharging.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting.

DETAILED DESCRIPTION OF THE ILLUSTRATED EMBODIMENTS

For the purposes of promoting an understanding of the principles of the disclosure, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages or may include different benefits or advantages. Any benefits or advantages described herein are not to be construed as limiting to any of the claims.

Likewise, there may be discussion with regards to "objects" associated with some embodiments of the present invention, it is understood that yet other embodiments may not be associated with those same objects, or may include yet different objects. Any advantages, objects, or similar words used herein are not to be construed as limiting to any of the claims. The usage of words indicating preference, such as "preferably," refers to features and aspects that are present in at least one embodiment, but which are optional for some embodiments.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

The embodiments of the present disclosure provide ferromagnetic materials and ferromagnetic housings adapted to be coupled with a handheld device which is also conducive to wireless battery charging for the device. "Ferromagnetism" is the basic mechanism by which certain materials (such as iron) form permanent magnets or are attracted to magnets. Ferromagnetic materials include, for example, but not limited to, iron, metals and alloys including iron, such as steel, and other metals, alloys, and composites, including those containing iron, nickel, or cobalt. In at least one embodiment, a ferromagnetic layer is coupled to the housing and forms a planar pattern of alternating areas defined by ferromagnetic material and nonferromagnetic material. In some embodiments, the ferromagnetic layer is embedded within the housing while in other embodiments the ferromagnetic layer is attached to a side of the housing.

Figure 1:
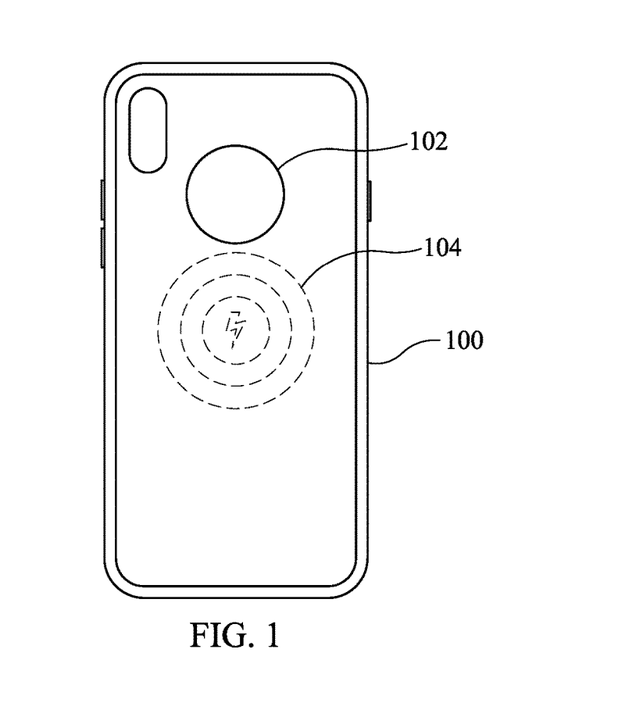
FIG. 1 is a rear view of an illustrative ferromagnetic housing and magnet placement of the prior art for a handheld device.

Depicted in FIG. 1 is a ferromagnetic accessory, such as ferromagnetic housing 100, for a handheld device of the prior art. In the prior art and illustrated in FIG. 1, typical magnetically mountable accessories for handheld devices include at least one solid, flat sheet (e.g., disc 102) of ferromagnetic material positioned on a handheld device or embedded within a housing 100 of a handheld device. However, this prior art design can cause the disc 102 to heat to an excessive and sometimes damaging temperature when the handheld device and disc 102 are placed on a wireless battery charging station. The heat is generally produced by the inductive coil of the wireless charging unit creating a fluctuating electromagnetic field in a central induction zone 104 of the handheld device where the induction coil is generally located within the handheld device. Ferromagnetic discs 102 placed in a central position of the handheld device, such as in the induction zone 104, can thereby induce eddy currents in the disc 102 and generate heat in the solid ferromagnetic material. As result, the handheld device can be damaged, for example by melting or deforming the surface of the handheld device coupled to the ferromagnetic disc 102 and/or melting or deforming the housing containing the ferromagnetic disc 102, the housing of which is typically molded from a thermoplastic material. For this reason, ferromagnetic discs 102 are required to be positioned in a location away from the induction zone 104, such as at the top (as illustrated in FIG. 1) or bottom of the rear surface of the handheld device or housing 100.

Figure 2A:
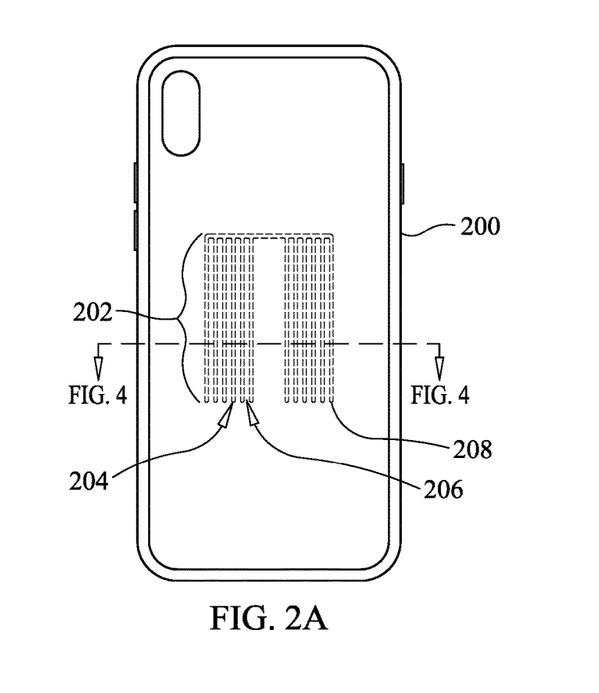
FIG. 2A is a rear view of a ferromagnetic housing of the present disclosure having a first embodiment of a ferromagnetic layer of the present disclosure located internal to the housing.

FIG. 2A illustrates an improved ferromagnetic accessory, for example housing 200, for a handheld device according to at least a first embodiment of the present disclosure. The housing 200 includes a ferromagnetic layer 202 coupled to the housing 200 and forming a planar pattern of alternating areas defined by ferromagnetic material 204 and nonferromagnetic material 206. The ferromagnetic material 204 can be any ferromagnetic material, for example, 400 series stainless steel, and the nonferromagnetic material 206 can be any nonferromagnetic material, for example, any nonmetal material. In at least one embodiment, the nonferromagnetic material may be defined by the material of the housing 200 which may be, for example, a moldable material, for example, thermoplastic polyurethane (TPU) or polycarbonate (PC). In an alternative embodiment, the nonferromagnetic material may be an air gap. In some illustrative embodiments of ferromagnetic layer 202, the total planar surface area of nonferromagnetic material 206 located within the bounds of the ferromagnetic layer 202 exceeds the total surface area of ferromagnetic material 204.

The ferromagnetic material 202 can be comprised of spaced-apart elongate members 208 which resemble planks, having a rectangular cross-section, or rods, having a circular cross-section, though other cross-sectional areas may be used. By employing spaced-apart members 208, induced eddy currents and resulting heating are minimized and inference with the coupling of the electromagnetic field between the charging and receiving induction coils is also minimized. The elongate members 208 can be any size or length and can be spaced apart to any degree such that excessive heat does not result when placed against a wireless battery charging station, i.e., an inductive coil. For ease of manufacturing and increased magnetic properties, the elongate members 208 are coupled at one end by a connecting portion of the ferromagnetic material (see also, FIG. 3B). In an illustrative embodiment, the ferromagnetic layer is die-cut from a sheet of ferromagnetic material 204; therefore, the elongate members 208 have a square or rectangular cross-section.

In some embodiments, wireless battery charging stations utilizing inductive coils may have the ability to detect that certain ferrous and/or metallic materials are located between the inductive coils and the charging stations may deactivate the inductive coils as result. For example, Qi, an open interface wireless power transfer standard using inductive charging, includes Foreign Object Detection which automatically interrupts power delivery if there is interference caused by a foreign object. In response to the presence of these foreign object detection systems integrated into wireless chargers, one or more of the spaced-apart elongate members 208 may be removed from the ferromagnetic layer 202 to create a void, which allows the ferromagnetic layer 202 to be undetected by the wireless charger, without prohibiting the accessory's 200 ability to securely vertically mount to a magnetic mounting accessory (see also, FIG. 3G). For example, as depicted in FIG. 2A, one or more elongate members 208, such as three elongate members 208, may be removed from the central most position of the ferromagnetic layer 202. In such embodiment, the void created is approximately equal to the sum of four times the spacing between the elongate members 208 and three times the width of the members 208, or between eight and 11 millimeters. In the exemplary embodiment, the void is equal to approximately 9.75 millimeters. In other embodiments, a greater or lesser number of elongate members 208 may be removed, such as two elongate members 208 or four elongate members 208. The elongate members 208 may remain coupled at one end by the connection portion of the ferromagnetic material despite the existence of a void created between the elongate members 208.

Figure 2B:
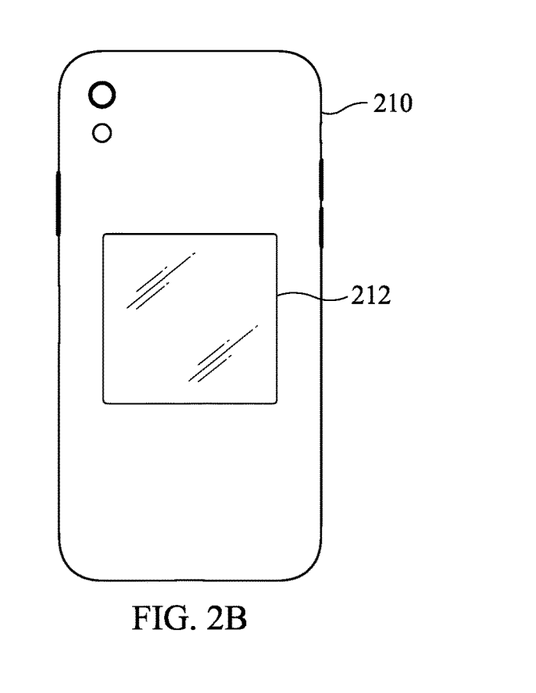
FIG. 2B is a rear view of a handheld device coupled with a second embodiment of a ferromagnetic layer of the present disclosure.

Depicted in FIG. 2B is another embodiment of a ferromagnetic accessory for a handheld device of the present disclosure. In this embodiment, a handheld device 210 is coupled to a second embodiment of a ferromagnetic layer, an improved planar ferromagnetic sheet 212 (see also, FIG. 3H). The ferromagnetic sheet 212 is configured according to particular specifications to support the weight of the handheld device when magnetically mounted in a vertical mounting position, such as in a vehicle. The ferromagnetic sheet 212 is also configured to permit an inductive power transfer therethrough it for wireless battery recharging of the handheld device.

Advantageous to ferromagnetic sheets of the prior art, ferromagnetic sheet 212 disclosed herein may be positioned directly adjacent the induction coil of a handheld device 210, i.e., in a central location on the handheld device 210, without prohibiting the operation of most induction-based wireless battery recharging stations which would generally deactivate upon the placement of a ferrous material between the coils of the recharging station and the handheld device 210. Central placement of a ferromagnetic material for magnetic mounting provides greater mounting stability if, for example, the vehicle it is mounting within experiences bumping and jarring. Central placement also provides greater mounting stability for a user who wishes to operate a touch-screen handheld device while the device is vertically mounted, as prior art magnetic mounting accessories often disengage from the mount in these circumstances.

Depicted in FIGS. 3A-F are alternative embodiments, shown without the nonferromagnetic portion of the housing accessory 200, of a ferromagnetic layer 202 according to the ferromagnetic housing 200 of the present disclosure. However, the illustrated alternative embodiments of FIGS. 3A-F do not represent an exhaustive catalog of effective patterns available for use as the ferromagnetic layer 202. As illustrated in some embodiments, the elongate members 208 can be arranged in parallel and include spaces in between them. In other embodiments, the elongate members 208 can be diverging perpendicularly from a central point of the ferromagnetic layer or can spiral outward from the central point.

As one skilled in the art can appreciate, a greater amount of ferromagnetic material results in a more secure connection to a magnetic mounting accessory. For example, the pattern for the ferromagnetic layer 202 of FIG. 3C presents a stronger magnetic connection than the pattern illustrated in FIG. 3B, and FIG. 3B presents a stronger magnetic connection than the pattern illustrated in FIG. 3C. Additionally, a greater amount of space, or nonferromagnetic material, between the ferromagnetic material can significantly reduce or eliminate the heat generated by the ferromagnetic layer 202 when placed against a wireless battery charging station. Therefore, the alternative patterns of ferromagnetic layers 202 disclosed herein advantageously allow varying capabilities of both magnetic mounting and wireless charging, although each alternative pattern provides sufficient ferromagnetic material 204 along with ample spacing to meet both the mounting and charging goals.

Figure 3A:
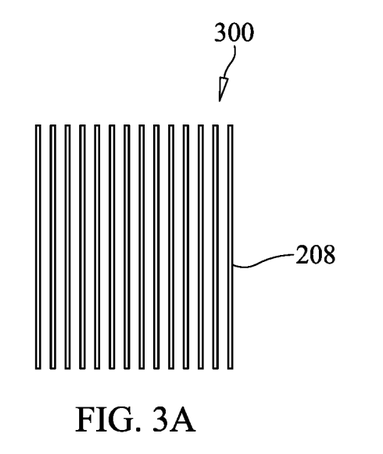
FIG. 3A is a third embodiment of a ferromagnetic layer of the present disclosure with the ferromagnetic layer illustratively removed from a housing and/or device.
Figure 3B:
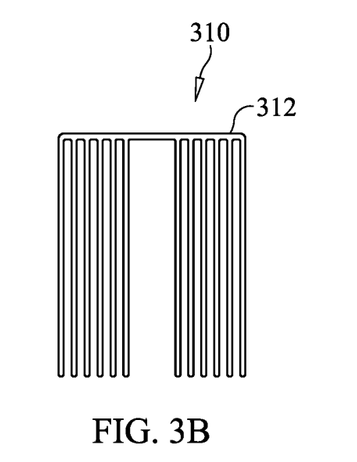
FIG. 3B is a fourth embodiment of a ferromagnetic layer of the present disclosure with the ferromagnetic layer illustratively removed from a housing and/or device.
Figure 3C:
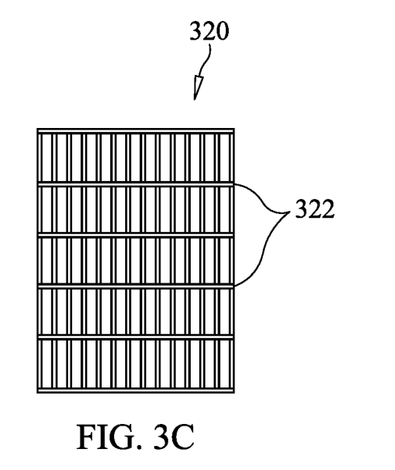
FIG. 3C is a fifth embodiment of a ferromagnetic layer of the present disclosure with the ferromagnetic layer illustratively removed from a housing and/or device.

In a first pattern embodiment 300, all elongate members 208 may be parallel and disconnected (shown in FIG. 3A). In this embodiment 300, the elongate members 208 may be, for example, between 30 and 40 millimeters long, 0.85 and 1.25 millimeters wide, 0.50 and 1 millimeter thick, and spaced apart by 1 to 2 millimeters. In the exemplary embodiment, the members 208 are approximately 33 millimeters long, 1 millimeter wide, 0.8 mm thick, and spaced apart by 1.5 millimeters.

In a second pattern embodiment 310, at least one cross connection 312 can couple the ferromagnetic material 204 across the nonferromagnetic material 206 (shown in FIG. 3B). In this embodiment 310, the elongate members 208 may be, for example, between 30 and 40 millimeters long, 0.85 and 1.25 millimeters wide, 0.50 and 1 millimeter thick, and spaced apart by 1 to 2 millimeters. In the exemplary embodiment, the members 208 are approximately 33 millimeters long, 1 millimeter wide, 0.8 millimeters thick, spaced apart by 1.5 millimeters. The cross connection 312 can also be, for example, 1 millimeter wide and 0.8 millimeters thick, or may be larger as necessary. The cross connection 312 can be any length necessary to connect all elongate members. When used with, for example, a BESTAND QI Wireless Charging Dock, a ferromagnetic housing 200 employing a ferromagnetic layer 202 having pattern 310 can charge the battery of a wireless-charging compatible smartphone by around 10% during a 15-minute timeframe, wherein the housing 200 temperature remains at about 93.9 degrees Fahrenheit. When magnetically mounted to, for example, a SCOOCH WINGMOUNT universal magnetic mount, a ferromagnetic housing 200 employing a ferromagnetic layer 202 having pattern 310 can support about 2 lb, 4.7 oz of weight.

In a third pattern embodiment 320, additional ferromagnetic material 204 can be provided by extra cross connections 322 such that the ferromagnetic layer 202 resembles a screen (shown in FIG. 3C). In this embodiment 320, the elongate members may be sized and shaped as those illustrated in the second pattern embodiment 310 but including additional cross connections 433 beyond the single cross connection 312 of the second pattern 310.

Figure 3D:
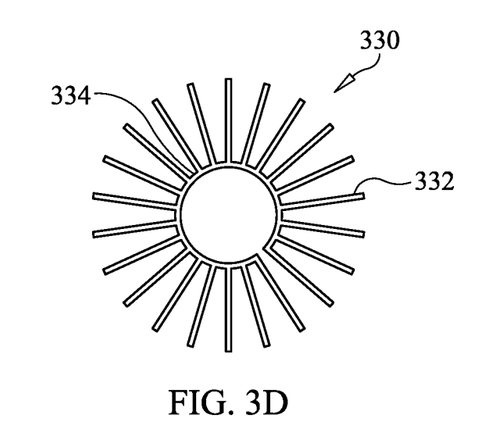
FIG. 3D is a sixth embodiment of a ferromagnetic layer of the present disclosure with the ferromagnetic layer illustratively removed from a housing and/or device.

In a fourth pattern embodiment 330, a plurality of elongate members 332 can be arranged such that each is diverging perpendicularly from a central ferromagnetic ring 334 such that the ferromagnetic layer 202 resembles a star (shown in FIG. 3D). In this embodiment 330, the elongate members 332 may be, for example, 0.85 and 1.25 millimeters wide and 0.50 and 1 millimeter thick. In the exemplary embodiment, the elongate members 332 are approximately one millimeter wide and 0.8 millimeter thick. When used with, for example, a BESTAND QI Wireless Charging Dock, a ferromagnetic housing 200 employing a ferromagnetic layer 202 having pattern 330 can charge the battery of a wireless-charging compatible smartphone by around 9% during a 15-minute timeframe, wherein the housing 200 temperature remains at about 91.9 degrees Fahrenheit. When magnetically mounted to, for example, a SCOOCH WINGMOUNT universal magnetic mount, a ferromagnetic housing 200 employing a ferromagnetic layer 202 having pattern 330 can support about 2 lb, 13 oz of weight.

Figure 3E:
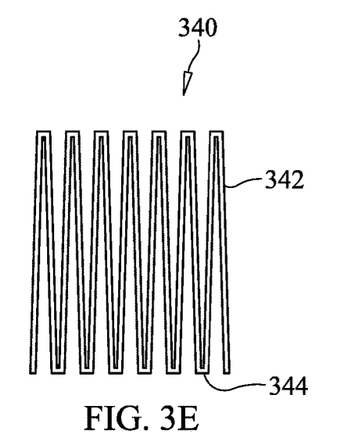
FIG. 3E is a seventh embodiment of a ferromagnetic layer of the present disclosure with the ferromagnetic layer illustratively removed from a housing and/or device.

In a fifth pattern embodiment 340, a plurality of elongate members 342 can be joined by end connectors 344 in an alternating pattern at each end such that the ferromagnetic layer 202 resembles a spring (shown in FIG. 3E). In this embodiment 340, the elongate members 342 may be, for example, between 30 and 40 millimeters long, 0.85 and 1.25 millimeters wide, 0.50 and 1 millimeter thick. In the exemplary embodiment, the members 342 may be, for example, approximately 42 millimeters long, 1.1 millimeters wide, and 0.8 mm thick. When used with, for example, a BESTAND QI Wireless Charging Dock, a ferromagnetic housing 200 employing a ferromagnetic layer 202 having pattern 340 can charge the battery of a wireless-charging compatible smartphone by around 10% during a 15-minute timeframe, wherein the housing 200 temperature remains at about 94.2 degrees Fahrenheit. When magnetically mounted to, for example, a SCOOCH WINGMOUNT universal magnetic mount, a ferromagnetic housing 200 employing a ferromagnetic layer 202 having pattern 340 can support about 3 lb, 5 oz of weight.

Figure 3F:
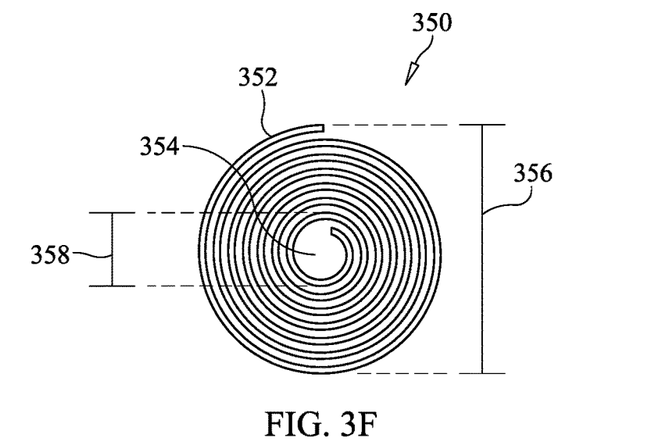
FIG. 3F is an eighth embodiment of a ferromagnetic layer of the present disclosure with the ferromagnetic layer illustratively removed from a housing and/or device.

In a sixth pattern embodiment 350, an elongate member 352 can be arranged such that it is diverging outwardly from a central gap 354 such that the ferromagnetic layer 202 resembles a spiral (shown in FIG. 3F). In this embodiment 350, the central gap 354 may have, for example, a gap diameter 358 of about 12 millimeters and the elongate member 352 may have an outer diameter 356 of about 40 millimeters.

Figure 3G:
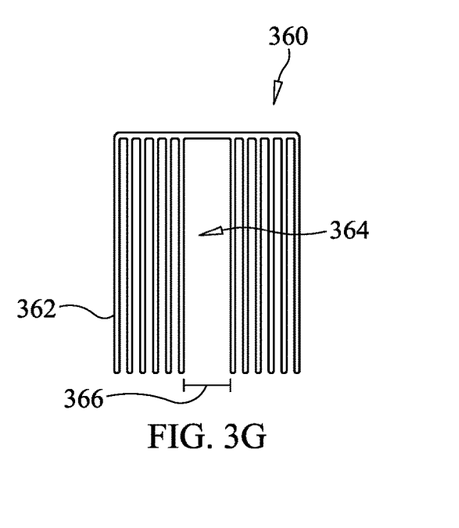
FIG. 3G is the ferromagnetic layer of FIG. 2A with the ferromagnetic layer illustratively removed from a housing and/or device.

In a seventh pattern embodiment 360 illustrated in FIG. 3G, at least one cross connection can couple the ferromagnetic material across the nonferromagnetic material, similar to the second pattern 310 illustrated in FIG. 3B. In this embodiment 360, the elongate members 362 may be, for example, between 30 and 40 millimeters long, 0.85 and 1.25 millimeters wide, 0.50 and 1 millimeter thick, and spaced apart by 1 to 2 millimeters. In the exemplary embodiment, the members 362 are approximately 33 millimeters long, 1 millimeter wide, 0.8 millimeters thick, spaced apart by 1.5 millimeters. The cross connection can also be, for example, 1 millimeter wide and 0.8 millimeters thick, or may be larger as necessary. The cross connection can be any length necessary to connect all elongate members. As described herein, one or more of the spaced-apart elongate members 362 may be removed from the pattern 360 to create a void 364 without prohibiting the pattern/s (i.e., the accessory's) ability to securely vertically mount to a magnetic mounting accessory. For example, one or more elongate members 362, such as three elongate members 362, may be removed from the central most position of the pattern 360. In such embodiment, the void 364 creates a void width 366 that is approximately equal to the sum of four times the spacing between the elongate members 362 and three times the width of the members 362, or between eight and 11 millimeters. In the exemplary embodiment, the void width 366 is equal to approximately 9.75 millimeters.

Figure 3H:
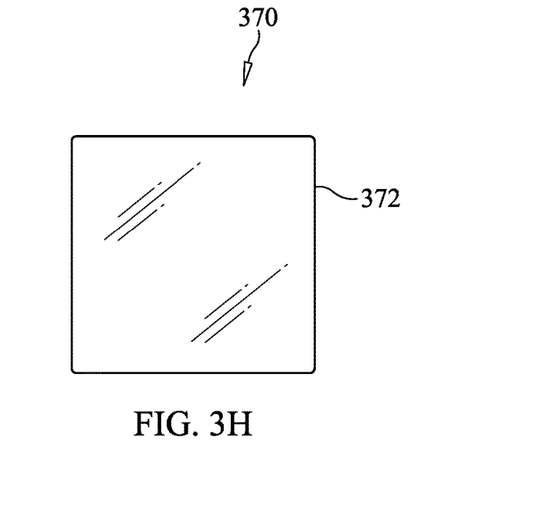
FIG. 3H is the ferromagnetic layer of FIG. 2B with the ferromagnetic layer illustratively removed from a housing and/or device.

In an eighth pattern embodiment 370, a solid and continuous ferromagnetic sheet 372 having particular characteristics is illustrated. To achieve the benefits described herein, the ferromagnetic sheet 372 of the present disclosure is comprised of a composite of an elastomer and a ferrous material, such as an iron powder and rubber, however, other composites of a ferromagnetic and nonferromagnetic material are contemplated. The ferromagnetic sheet 370 can have a thickness, for example, of between 0.2 and 0.6 millimeters. In the exemplary embodiment, the sheet 372 is approximately 0.4 millimeters thick. The sheet may be formed to any dimensions (length, width, and thickness) depending on the application, i.e., the size and weight of the handheld device. For a common touch-screen handheld mobile device, the sheet 372 can be approximately 45 millimeters wide and 45 millimeters tall. A suitable illustrative ferromagnetic sheet 372 that is a composite of iron and an elastomer is available from Wit Magnet Co., Ltd. of Shenzhen, China (www.witmagnet.com) or from API Delevan of East Aurora, NY. A double-sided adhesive (not illustrated) can be used to attach the ferromagnetic sheet 212 to the handheld device or device housing. The ferromagnetic sheet 372 and adhesive may be sold as a kit along with a magnetic mounting accessory having a base and a magnet coupled to the base, configured for mounting in any particular environment (e.g., a vehicle).

These additional embodiments can provide modifications to the ferromagnetic functionality or can assist in manufacturability or durability. For easier manufacturing, the ferromagnetic layer 202 can be stamped to form the alternating nonferromagnetic areas within a solid sheet of ferromagnetic material in any case. The elongate members may contain one or more planar surfaces in alternate embodiments or may be cylindrical in some embodiments.

Figure 4:
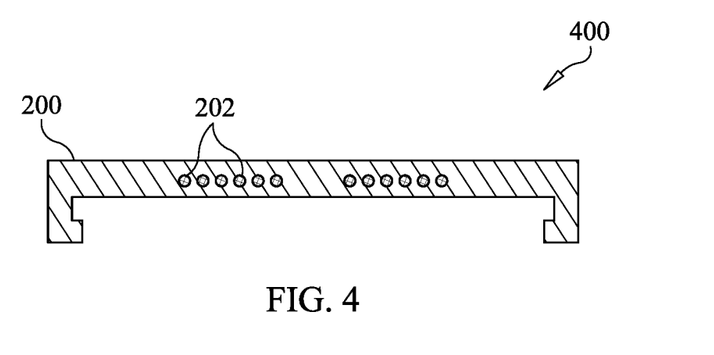
FIG. 4 is a cross-sectional view from the bottom perspective of the ferromagnetic layer of FIG. 3G illustrating a first placement location of a ferromagnetic layer of the present disclosure in relation to a housing, with the cutting plane centrally located through the device.
Figure 5:
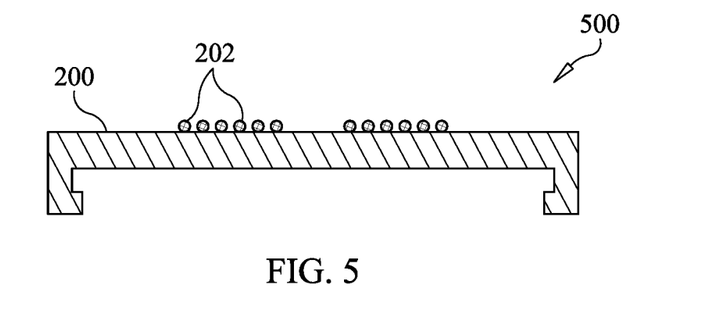
FIG. 5 is a cross-sectional view from the bottom perspective of the ferromagnetic layer of FIG. 3G illustrating a second placement location of a ferromagnetic layer of the present disclosure in relation to a housing, with the cutting plane centrally located through the device.
Figure 6:
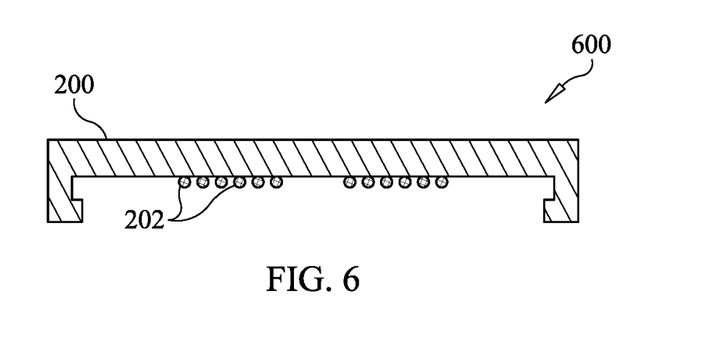
FIG. 6 is a cross-sectional view from the bottom perspective of the ferromagnetic layer of FIG. 3G illustrating a third placement location of a ferromagnetic layer of the present disclosure in relation to a housing, with the cutting plane centrally located through the device.

Depicted in FIGS. 4-6 are alternative embodiments of placements of a ferromagnetic layer 202 according to the accessory 200 of the present disclosure. In a first placement embodiment 400, shown in FIG. 4, the ferromagnetic layer 202 can be embedded within the housing 200, for example, during thermoplastic molding of the housing. In a second placement embodiment 500, shown in FIG. 5, the ferromagnetic layer 202 can be attached to the side of the housing opposite to the typical placement of the handheld device. In a third placement embodiment 600, shown in FIG. 6, the ferromagnetic layer 202 can be attached to the same side of the housing as the typical placement of the handheld device. In a fourth placement embodiment, the ferromagnetic layer may be directly coupled to a handheld device without a housing. For example, the ferromagnetic sheet 212 illustrated in FIG. 2B is directly coupled to the handheld device 210.

Figure 7:
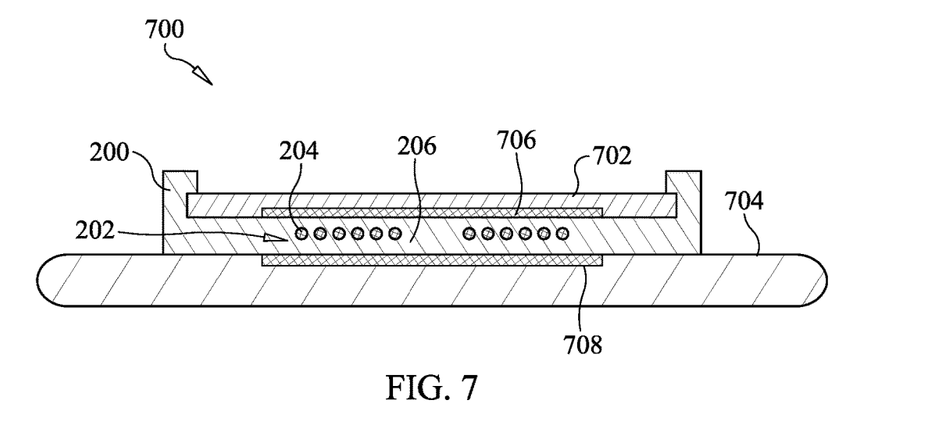
FIG. 7 is a cross-sectional view from the top perspective of the ferromagnetic layer of FIG. 3G in an illustrative environment within a housing coupled with a handheld device and positioned on a wireless battery charging station for the handheld device, with the cutting plane centrally located through the handheld device and wireless battery charging station.

Depicted in FIG. 7 is an illustrative battery-charging environment 700 of a handheld device 702, such as a smartphone, connected to a wireless charging station 704. When used in such an environment, one embodiment of a ferromagnetic accessory 200 of the present disclosure, in particular an embodiment utilizing the ferromagnetic layer of FIG. 3G, includes spaces 206 between the ferromagnetic material 204 and a central void, which collectively permit the electromagnetic field generated by the electromagnetic transmitter module 208 (e.g., a first induction coil) of the wireless charging station 704 to pass through to the electromagnetic receiver module 706 (e.g., a second induction coil) of the handheld device 702 without generating excessive heat as it passes through the ferromagnetic layer 202.

Figure 8:
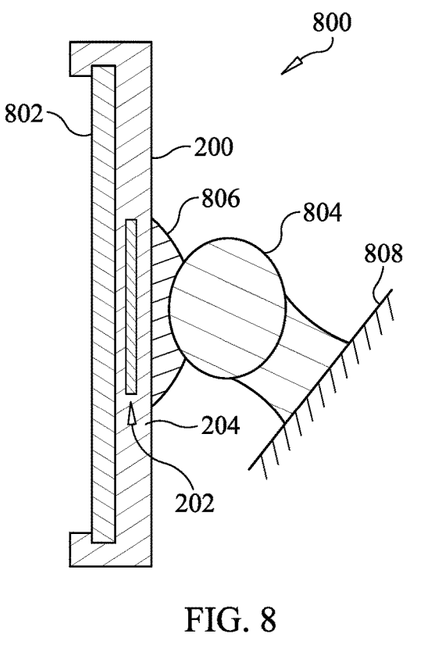
FIG. 8 is a cross-sectional view from the right-side perspective of the first embodiment of the ferromagnetic layer in an illustrative environment within a housing coupled with a handheld device and vertically mounted to a magnetic mount, with the cutting plane centrally located through the handheld device and magnetic mount.

Depicted in FIG. 8 is an illustrative environment 800 of a handheld device 802, such as a smartphone, connected to a magnetic mounting accessory 804 which is attached to a surface 808. When used in such an environment, one embodiment of a ferromagnetic accessory 200 of the present disclosure, in particular an embodiment utilizing the ferromagnetic layer of FIG. 3G, provides a firm magnetic connection with a magnet 806 of the magnetic mounting accessory 804. Specifically, the ferromagnetic material 204 within the ferromagnetic layer 202 is magnetically attracted to the magnetic mounting accessory 804 and provides a secure magnetic connection when the device 802 is mounted in a vertical position.

Figure 9:
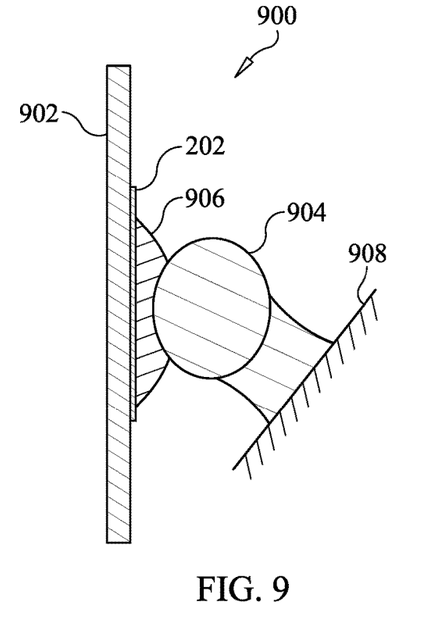
FIG. 9 is a cross-sectional view from the right-side perspective of the second embodiment of the ferromagnetic layer in an illustrative environment coupled with a handheld device and vertically mounted to a magnetic mount, with the cutting plane centrally located through the handheld device and magnetic mount.

Depicted in FIG. 9 is an illustrative environment 900 of a handheld device 902, such as a smartphone, connected to a magnetic mounting accessory 904 which is attached to a surface 908. When used in such an environment, one embodiment of a ferromagnetic layer 202 of the present disclosure, in particular an embodiment utilizing the ferromagnetic sheet 372 of FIG. 3H, provides a firm magnetic connection with a magnet 906 of the magnetic mounting accessory 904. Specifically, the ferromagnetic layer 202 is magnetically attracted to the magnetic mounting accessory 904 and provides a secure magnetic connection when the device 902 is mounted in a vertical position.

Figure 10:
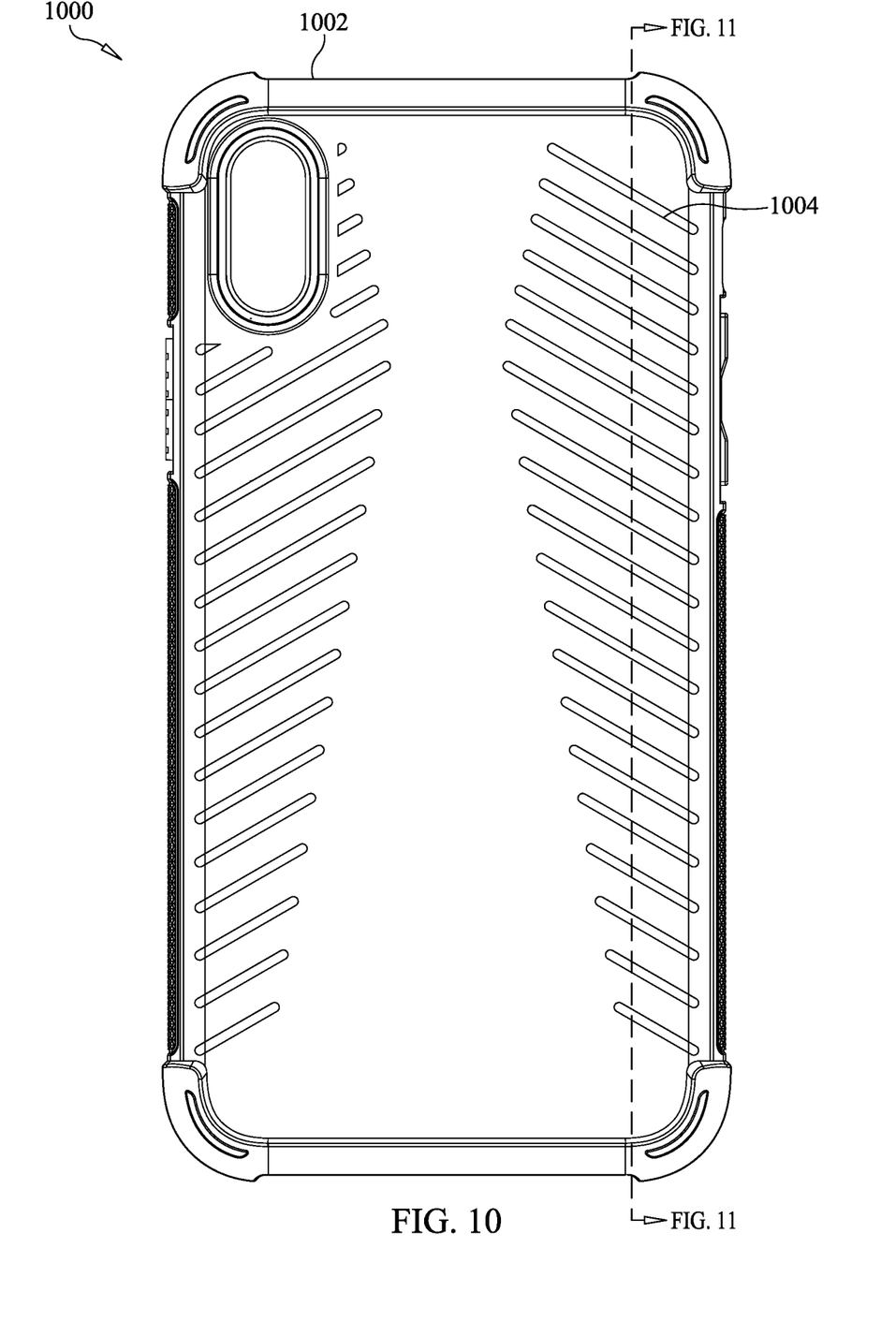
FIG. 10 is a rear view of one embodiment of a housing of the present disclosure.
Figure 11A:
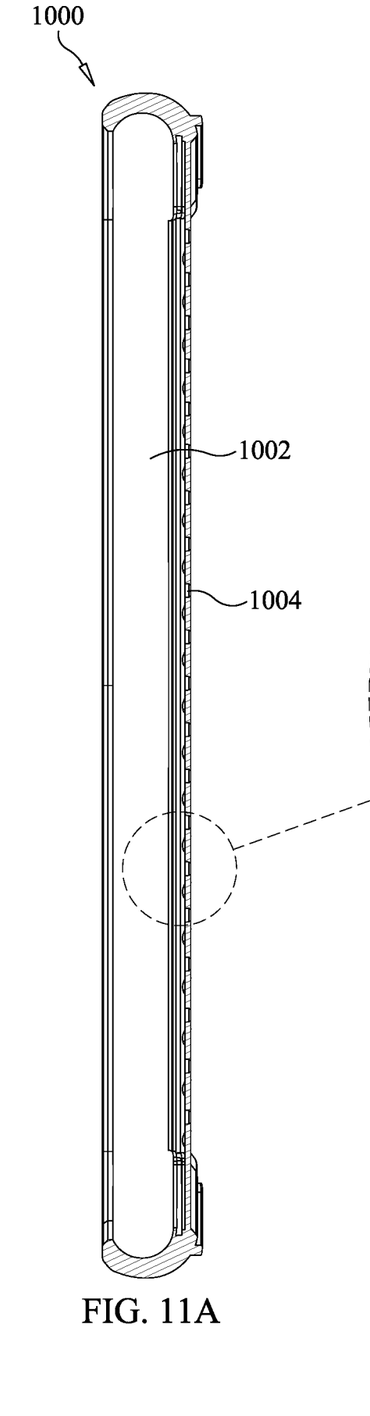
FIG. 11A is a cross-sectional view taken along cutting plane FIG. 11-FIG. 11 of the embodiment of the housing of FIG. 10.
Figure 11B:
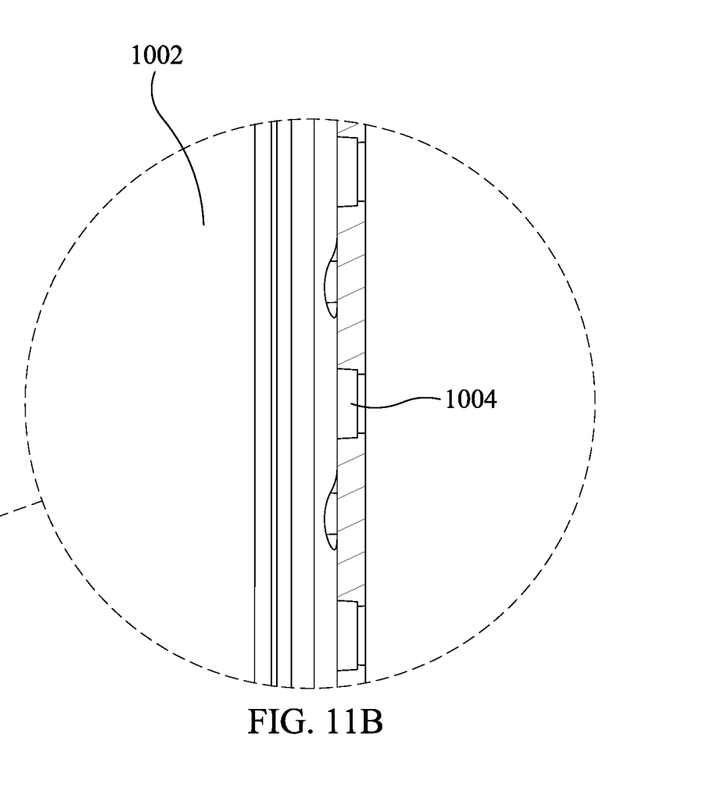
FIG. 11B is an enlarged sectional view of a portion of FIG. 11A.

As illustrated and described herein, magnetically mountable accessories are commonly adapted to be vertically mounted to a magnetic mount (see, for example, FIGS. 8-9). Ferromagnetic housing accessories of the prior art often have smooth mounting surfaces resulting in the associated handheld device and housing sliding while experiencing jarring and bumps which may be associated with the mounting environment (e.g., a vehicle). Depicted in FIGS. 10, 11A, and 11B is an improved ferromagnetic accessory 1000 according to the embodiments of the present disclosure. The accessory 1000 includes a housing 1002 (e.g., a fitted case), a ferromagnetic layer embedded within (not shown), and is adapted to be coupled to a handheld device (e.g., a smartphone). Accessory 1000 according to the present disclosure advantageously forms a plurality of indentations 1004 on the magnetic mounting surface for increasing the sheer pressure and surface friction between the accessory 1000 and a magnetic mount upon their engagement, thereby supporting the accessory 1000 and associated handheld device in a stable position relative to the mount during jarring and shaking events, or during user operation while magnetically mounted.

Reference systems that may be used herein can refer generally to various directions (e.g., upper, lower, forward and rearward), which are merely offered to assist the reader in understanding the various embodiments of the disclosure and are not to be interpreted as limiting. Other reference systems may be used to describe various embodiments, such as referring to the direction of projectile movement as it exits the firearm as being up, down, rearward or any other direction.

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected.

ELEMENT NUMBERING

The following is a list of element numbers and at least one noun used to describe that element. It is understood that none of the embodiments disclosed herein are limited to these descriptions, and these element numbers can further include other words that would be understood by a person of ordinary skill reading and reviewing this disclosure in its entirety.

| Ref. No. | Description |
| --- | --- |
| 100 | Ferromagnetic Accessory for a Handheld Device (Prior Art) |
| 102 | Flat Disc of Ferromagnetic Material (Prior Art) |
| 200 | Ferromagnetic Accessory for a Handheld Device |
| 202 | Ferromagnetic Layer |
| 204 | Ferromagnetic Material |

-continued

| Ref. No. | Description |
| --- | --- |
| 206 | Nonferromagnetic Material |
| 208 | Elongate Members |
| 210 | Handheld Device |
| 212 | Ferromagnetic Sheet |
| 300 | First Pattern Embodiment (Ferromagnetic Layer) |
| 310 | Second Pattern Embodiment |
| 312 | One Cross Connection |
| 320 | Third Pattern Embodiment |
| 322 | Extra Cross Connections |
| 330 | Fourth Pattern Embodiment |
| 332 | Elongate Members |
| 334 | Central Ferromagnetic Ring |
| 340 | Fifth Pattern Embodiment |
| 342 | Elongate Members |
| 344 | End Connectors |
| 350 | Sixth Pattern Embodiment |
| 352 | Elongate Member |
| 354 | Central Gap |
| 356 | Outer Diameter |
| 358 | Gap Diameter |
| 360 | Seventh Pattern Embodiment |
| 362 | Elongate Member |
| 364 | Void |
| 366 | Void Width |
| 370 | Eight Pattern Embodiment |
| 372 | Ferromagnetic Sheet |
| 400 | First Placement Embodiment (Ferromagnetic Layer) |
| 500 | Second Placement Embodiment (Ferromagnetic Layer) |
| 600 | Third Placement Embodiment (Ferromagnetic Layer) |
| 700 | Battery Charging Environment |
| 702 | Handheld Device |
| 704 | Wireless Charging Station |
| 706 | Electromagnetic Receiver Module (Handheld Device) |
| 708 | Electromagnetic Transmitter Module (Wireless Charging Station) |
| 800 | Magnetic Mounting Environment |
| 802 | Handheld Device |
| 804 | Magnetic Mounting Accessory |
| 806 | Magnet (Magnetic Mounting Accessory) |
| 808 | Surface |
| 900 | Magnetic Mounting Environment |
| 902 | Handheld Device |
| 904 | Magnetic Mounting Accessory |
| 906 | Magnet (Magnetic Mounting Accessory) |
| 908 | Surface |
| 1000 | Ferromagnetic Accessory |
| 1002 | Housing |
| 1004 | Indentations |

What is claimed is:

1. A mounting kit for a handheld device having a coil for wireless battery recharging, comprising:
   a mounting base;
   a magnet coupled to the mounting base; and
   a planar sheet adapted for attachment to the handheld device, wherein the planar sheet is formed of a ferromagnetic material and defines first and second opposing faces and first and second opposing edges, wherein the ferromagnetic material is continuous between the first and second opposing edges and between the first and second opposing faces; and
   wherein the planar sheet is coupled to the magnet and is configured to support the weight of the handheld device in a vertical mounting position, and the planar sheet is configured to permit an inductive power transfer therethrough for the wireless battery recharging of the handheld device.

2. The mounting kit of claim 1, further comprising a double-sided adhesive coupled on a first side to the planar sheet and on a second side to the handheld device.

3. The mounting kit of claim 1, wherein the ferromagnetic material of the planar sheet includes a composite of an elastomer and a ferrous material.

4. The mounting kit of claim 1, wherein the planar sheet is attached to the handheld device adjacent the coil for the wireless battery recharging.

5. An apparatus for a handheld device, wherein the handheld device includes an electromagnetic receiver configured to interact with an electromagnetic transmitter for wireless battery recharging of the handheld device, the apparatus comprising:
 a housing having a first side and a second side, the first side adapted to be coupled to and cover at least a portion of a handheld device; and
 a ferromagnetic sheet defining first and second opposing edges and first and second opposing faces, wherein the ferromagnetic sheet is continuous between the first and second opposing edges and between the first and second opposing faces, wherein the ferromagnetic sheet is coupled with the housing;
 wherein the ferromagnetic sheet is configured to support the weight of the handheld device in a vertical magnetic mounting position and is simultaneously configured to permit inductive power transfer therethrough the ferromagnetic sheet.

6. The apparatus of claim 5, wherein the ferromagnetic sheet is a composite of an elastomer material and a ferrous material.

7. The apparatus of claim 6, wherein the elastomer material includes rubber and the ferrous material includes iron powder.

8. The apparatus of claim 5, wherein the ferromagnetic sheet is formed with a thickness of between 0.2 millimeters and 0.6 millimeters.

9. The apparatus of claim 5, wherein the ferromagnetic sheet is 45 millimeters wide and 45 millimeters tall.

10. A handheld device assembly comprising:
 a handheld device having an electromagnetic receiver, wherein the electromagnetic receiver is configured for receiving the inductive power through the housing for wireless battery recharging of the handheld device;
 an electromagnetic transmitter, wherein the electromagnetic transmitter is configured to transmit the inductive power along a transfer path through the housing to the electromagnetic receiver; and
 the apparatus of claim 5, wherein the ferromagnetic sheet is coupled with the housing at a position along the transfer path between the electromagnetic transmitter and the electromagnetic receiver.

\* \* \* \* \*